United States Patent
Sumi

(10) Patent No.: US 9,899,884 B2
(45) Date of Patent: Feb. 20, 2018

(54) MOTOR ARMATURE AND MOTOR

(71) Applicant: Nidec Corporation, Kyoto (JP)

(72) Inventor: Shigeharu Sumi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 351 days.

(21) Appl. No.: 14/749,895

(22) Filed: Jun. 25, 2015

(65) Prior Publication Data
US 2016/0065007 A1  Mar. 3, 2016

(30) Foreign Application Priority Data
Aug. 27, 2014 (JP) .................. 2014-173284

(51) Int. Cl.
*H02K 1/08* (2006.01)
*H02K 1/14* (2006.01)

(52) U.S. Cl.
CPC ............... *H02K 1/08* (2013.01); *H02K 1/146* (2013.01)

(58) Field of Classification Search
CPC .................. H02K 1/08; H02K 1/146
See application file for complete search history.

(56) References Cited

U.S. PATENT DOCUMENTS

| | | | | |
|---|---|---|---|---|
| 1,355,347 A * | 10/1920 | Mortensen | ............... | H02K 1/08 310/216.086 |
| 2,736,829 A * | 2/1956 | Sills | ............... | H02K 1/08 310/216.048 |
| 3,786,293 A * | 1/1974 | Boning | ............... | H02K 1/08 310/269 |
| 3,797,106 A * | 3/1974 | Costello | ............... | H02K 1/08 29/598 |
| 4,118,648 A * | 10/1978 | Gillet | ............... | H02K 1/08 310/269 |
| 5,089,730 A * | 2/1992 | O'Connor | ............... | H02K 1/148 310/51 |
| 6,664,696 B1 * | 12/2003 | Pham | ............... | H02K 29/03 310/216.106 |
| 6,864,612 B1 * | 3/2005 | Gotoh | ............... | H02K 1/145 310/172 |
| 7,528,516 B2 * | 5/2009 | Mipo | ............... | H02K 1/16 310/172 |
| 8,076,815 B2 * | 12/2011 | Freudenberg | ............... | H02K 41/033 310/12.01 |
| 8,198,776 B2 * | 6/2012 | Mathoy | ............... | H02K 1/246 310/156.48 |
| 8,704,422 B2 * | 4/2014 | Jurkowski | ............... | H02K 1/146 29/596 |
| 8,754,563 B2 * | 6/2014 | Nagai | ............... | G11B 19/2009 310/216.091 |
| 8,912,703 B2 * | 12/2014 | Oh | ............... | H02K 21/222 310/216.094 |

(Continued)

FOREIGN PATENT DOCUMENTS

| | | |
|---|---|---|
| JP | 2011-160578 A | 8/2011 |
| JP | 5561148 B2 | 7/2014 |

*Primary Examiner* — Robert W Horn
(74) *Attorney, Agent, or Firm* — Keating & Bennett, LLP

(57) ABSTRACT

A motor armature includes a core including a stack of electromagnetic steel sheets, a tooth portion extending in a radial direction of the motor, and a conductive wire that is wound around the tooth portion in a circumferential direction. First recessed portions extending in the radial direction are located in a surface of the tooth portion of each of the electromagnetic steel sheets of the core.

14 Claims, 12 Drawing Sheets

(56) References Cited

U.S. PATENT DOCUMENTS

2009/0243415 A1* 10/2009 Hoppe ................... H02K 1/08
                                                          310/154.11
2016/0065007 A1*  3/2016 Sumi ..................... H02K 1/146
                                                          310/216.057
2017/0117760 A1*  4/2017 Greenlaw ............. H02K 1/146

* cited by examiner

MOTOR ARMATURE AND MOTOR

BACKGROUND OF THE INVENTION

1. Field of the Invention

The present invention relates to a motor armature and a motor.

2. Description of the Related Art

As causes of inefficiency in driving motors, there have been known copper losses generated by a resistance component of a winding, core losses generated by physical properties of a core constituting an armature, and mechanical losses generated by friction in rotational motion. While the core losses can be further classified into hysteresis losses and eddy current losses, the eddy current losses account for a large proportion. Therefore, it is necessary to reduce the eddy current losses in order to improve motor efficiency by reducing the core losses. Eddy currents are currents generated in the core by an electromagnetic induction action. When a magnetic flux in the core changes, the eddy currents flow in a direction to oppose the change in direction of the magnetic flux. The eddy current losses are energy lost as Joule heat by the flow of the eddy currents.

A motor core is normally formed by stacking a plurality of electromagnetic steel sheets. Each of the electromagnetic steel sheets is defined by a planar body where an insulating layer is formed on a surface. An eddy current loss Pe in a planar conductor is known to be expressed by the following expression 1 using a thickness h of the conductor, a frequency f, a maximum magnetic flux density Bm, and a resistivity ρ of a magnetic material. According to the expression, it is understood that the eddy current loss becomes ¼ by decreasing a thickness of the electromagnetic steel sheet used for the core to ½. That is, it is understood that the eddy current loss is reduced by decreasing the thickness of the electromagnetic steel sheet.

$$Pe = \frac{\pi^2}{6\rho} Bm^2 f^2 h^2 \quad \text{Expression 1}$$

Also, a method for reducing the core losses by devising a shape of a stator core has been conventionally proposed (See, for example, Japanese Patent Laid-Open Nos. 2011-160578 and 2012-135123).

Japanese Patent Laid-Open No. 2011-160578 discloses a core in which a plurality of slits parallel to a compressive stress are provided in a back yoke portion. It is described that the compressive stress by shrink fitting is relaxed, and the core losses can be reduced by employing the configuration.

However, when the thickness of the electromagnetic steel sheet is decreased in order to reduce the eddy current losses, a mechanical strength of the electromagnetic steel sheet is disadvantageously lowered, and it disadvantageously becomes difficult to machine the electromagnetic steel sheet.

When the slits are provided in the back yoke portion in order to reduce the eddy current losses, the mechanical strength of the electromagnetic steel sheet is also disadvantageously lowered.

SUMMARY OF THE INVENTION

In accordance with a preferred embodiment of the present invention, a motor armature includes a core including a stack of two or more electromagnetic steel sheets, the core including a tooth portion extending in a radial direction of the motor; and a conductive wire that is wound around the tooth portion in a circumferential direction, wherein two or more first recessed portions extending in the radial direction are located in a surface of the tooth portion of each of the electromagnetic steel sheets.

In accordance with preferred embodiments of the present invention, motor efficiency is improved by reducing eddy current losses.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following, preferred embodiments of the present invention are described with reference to the drawings. Although the present specification is described by assuming that a direction parallel or substantially parallel to a center axis J of a motor is an up-down direction for the sake of convenience, a position of the motor in use in the present invention is not limited by the assumption. Also, it is assumed herein that the direction parallel or substantially parallel to the center axis J of the motor is referred to simply as an "axial direction", and a radial direction and a circumferential direction centering on the center axis J are referred to simply as a "radial direction" and a "circumferential direction", respectively. It is similarly assumed herein that directions of an armature and a core of the armature corresponding to the axial direction, the radial direction, and the circumferential direction of the motor in a state in which the armature and the core are incorporated in the motor are also referred to as an "axial direction", a "radial direction", and a "circumferential direction", respectively.

Preferred Embodiment 1

Figure 1:
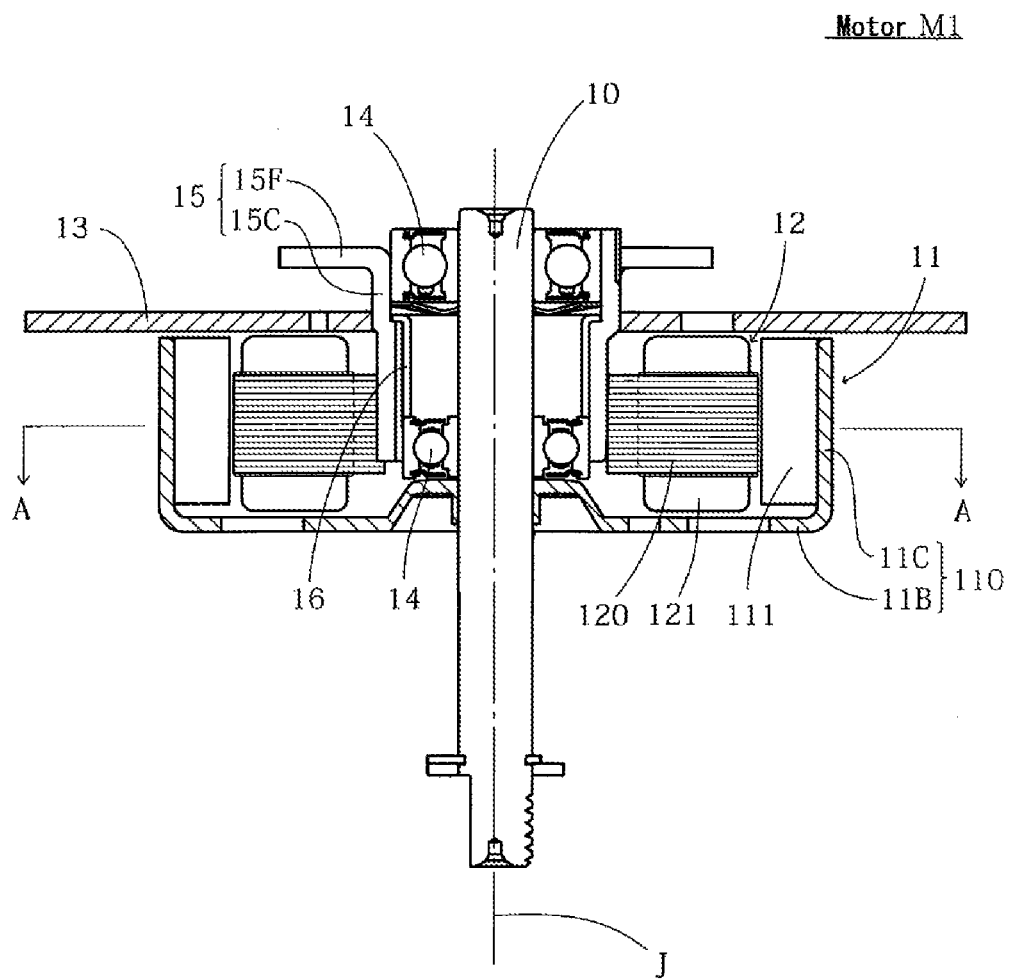
FIG. 1 is a sectional view schematically illustrating one configuration example of a motor according to Preferred Embodiment 1 of the present invention.

FIG. 1 is a view illustrating one configuration example of a motor according to one exemplary preferred embodiment of the present invention, and shows a section taken along a plane including the center axis J. The motor is preferably used, for example, as a driving source of a driving apparatus for home electric appliances, business machines, medical instruments, automobiles or the like. The motor preferably includes a stator portion that is fixed to a frame body of the driving apparatus, and a rotor portion that is rotatably supported by the stator portion. The rotor portion includes a shaft 10 and a rotor 11. On the other hand, the stator portion preferably includes a stator 12, a circuit board 13, bearings 14, a bracket 15, and a spacer 16. In the following, the respective components are described in detail.

The shaft 10 is a columnar or substantially columnar member that extends in the axial direction (the up-down direction). The shaft 10 is supported by the two bearings 14, and rotates about the center axis J.

The rotor 11 is a member that rotates together with the shaft 10. The rotor 11 rotates relative to the stator 12. The rotor 11 preferably includes a rotor holder 110 and a rotor magnet 111. The rotor holder 110 preferably includes a cylindrical portion 11C and a bottom plate portion 11B, and also has a bottomed cylindrical shape including an opening on an axially upper side. The cylindrical portion 11C has a cylindrical or substantially cylindrical shape, and is located on a radially outer side of the stator 12. The bottom plate portion 11B is a planar member that extends radially inward from a lower end of the cylindrical portion 11C. The bottom plate portion 11B is located below the stator 12 and fixed to the shaft 10. The rotor magnet 111 is a magnet that is fixed to an inner circumferential surface of the cylindrical portion 11C of the rotor holder 110. A pole surface facing the stator 12 is provided on an inner circumferential surface of the rotor magnet 111. The pole surface is magnetized such that an N pole region and an S pole region are alternately defined in the circumferential direction.

The stator 12 is an armature of the motor. The stator 12 preferably has an annular or substantially annular ring shape, and is fixed to the bracket 15. The stator 12 is also located on a radially inner side of the rotor 11. An outer circumferential surface of the stator 12 radially faces the rotor magnet 111 with a gap therebetween.

The circuit board 13 is a board on which an electronic circuit (not shown) that supplies a drive current to a coil 121 is mounted. The circuit board 13 is preferably provided by a planar body having a circular or substantially circular shape. The circuit board 13 is located on an axially upper side of the rotor 11, and faces the axially-upper opening of the rotor holder 110. The circuit board 13 also preferably includes a through hole corresponding to the bracket 15.

The bearings 14 are members that rotatably support the shaft 10. For example, a ball bearing is preferably used; however, any other desirable type of bearing could be used instead. Both of the two bearings 14 are preferably fixed to the shaft 10 by, for example, press fitting, and are loosely fitted to the bracket 15. The bearings 14 are accommodated in the bracket 15 by interposing the spacer 16 fixed within the bracket 15 between the bearings 14 and the bracket 15.

The bracket 15 is a bracket holding portion that accommodates the bearings 14, and is preferably obtained by pressing a metal sheet such as a galvanized steel sheet. The bracket 15 is preferably defined by a cylindrical portion 15C that is fixed to an inner circumferential surface of the stator 12 by press fitting, and a flange portion 15F that extends radially outward from an upper end of the cylindrical portion 15C. The spacer 16 having a cylindrical or substantially cylindrical shape is accommodated in the cylindrical portion 15C. By press-fitting the spacer 16 into the bracket 15, the two bearings 14 are supported by the bracket 15.

Figure 2:
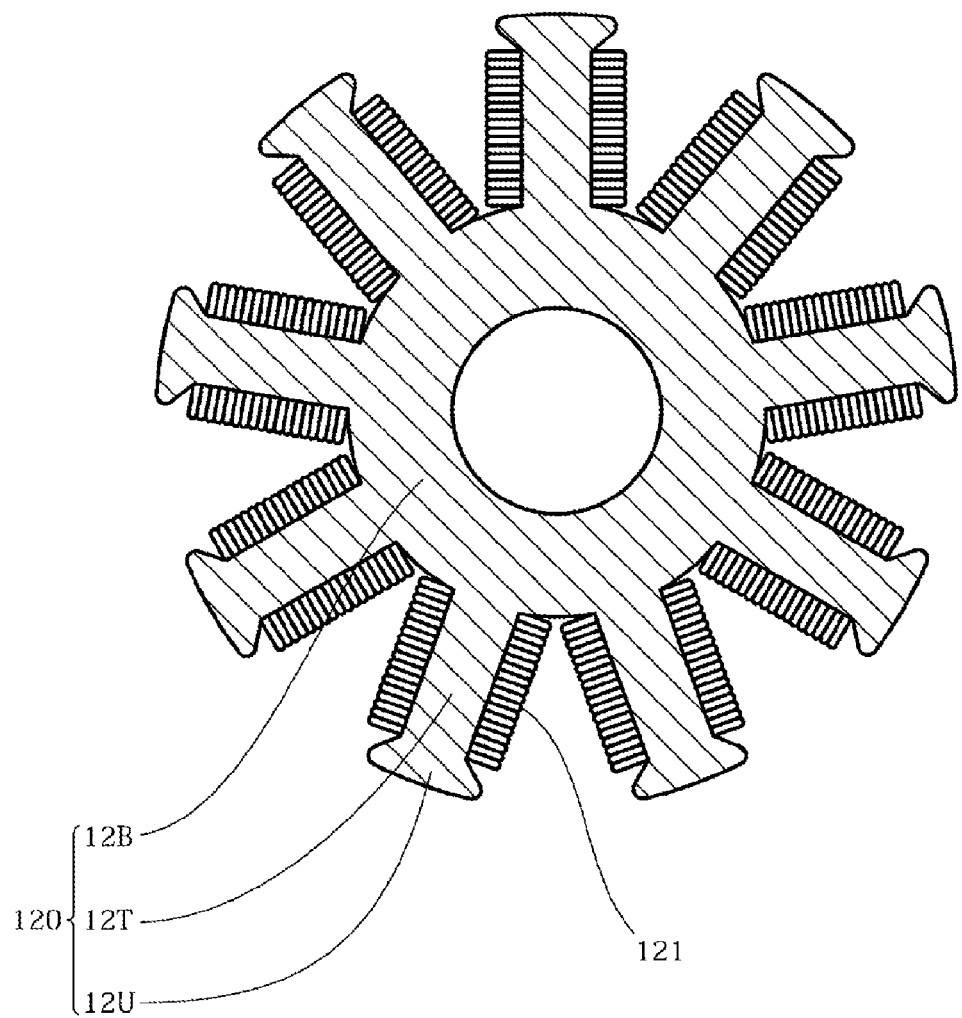
FIG. 2 is a sectional view illustrating a section of a stator 12 in FIG. 2.
Figure 3:
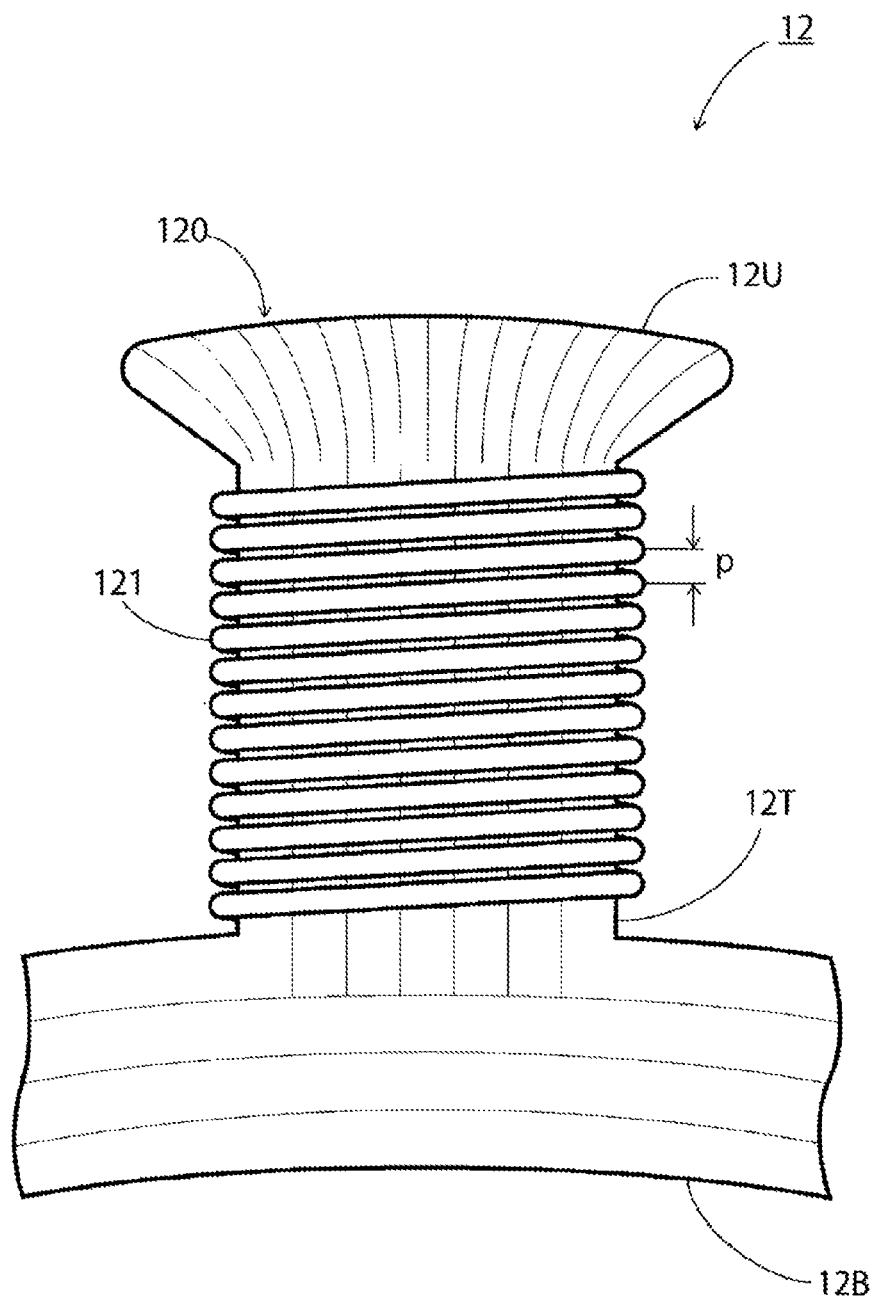
FIG. 3 is an enlarged view of a tooth portion 12T in FIG. 2 as viewed from an axial direction.
Figure 4:
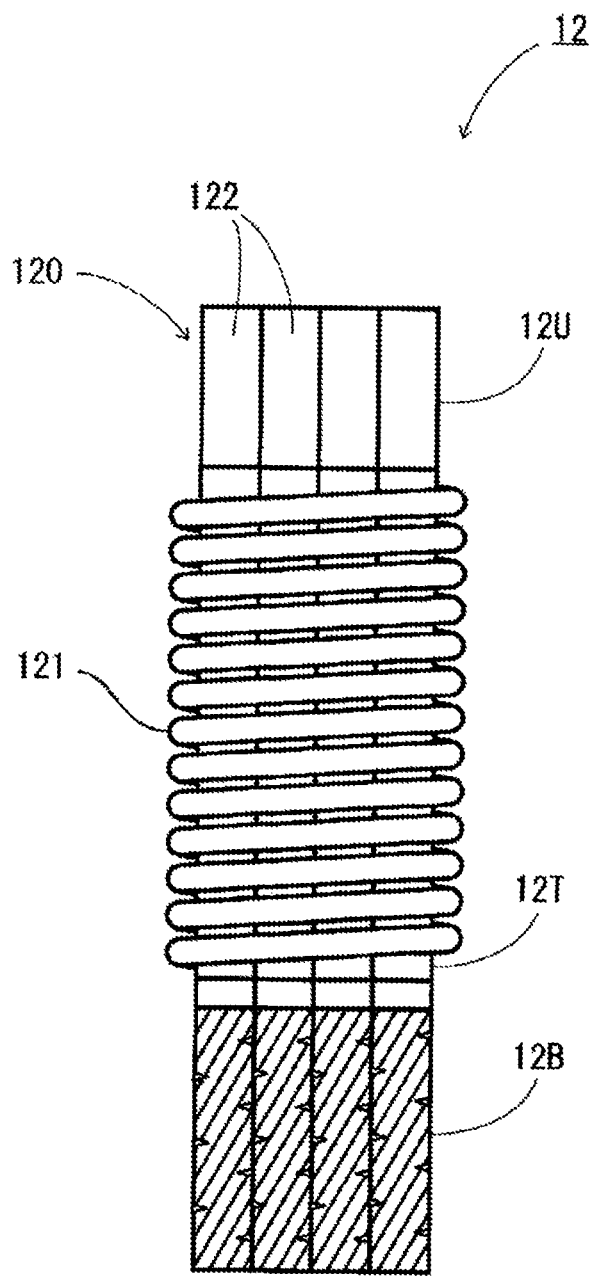
FIG. 4 is an enlarged view of the tooth portion 12T in FIG. 1 as viewed from a circumferential direction.

FIGS. 2 to 4 are views illustrating a detailed configuration of the stator 12 in FIG. 1. FIG. 2 is a sectional view illustrating a section of the stator 12 taken along a cutting line A-A in FIG. 1. FIGS. 3 and 4 are enlarged views illustrating a portion of the stator 12 in an enlarged scale. FIG. 3 shows an appearance of a tooth portion 12T as viewed from the axial direction, and FIG. 4 shows an appearance of the tooth portion 12T as viewed from the circumferential direction.

A core 120 is preferably a laminate member defined by stacking two or more electromagnetic steel sheets 122 in the axial direction (the up-down direction). For example, 20 silicon steel sheets each having a thickness of about 350 μm may be stacked to obtain the core 120. Also, the core 120 is defined by the electromagnetic steel sheets 122 having the same thickness and the same planar shape. Therefore, the planar shape of the electromagnetic steel sheets 122 corresponds to that of the core 120. The planar shape of the core 120 is preferably defined by a ring-shaped core back portion 12B, a plurality of tooth portions 12T that extend radially outward from an outer circumferential edge of the core back portion 12B, and a plurality of umbrella portions 12U that are located at radially outer ends of the tooth portions 12T, respectively.

The core back portion 12B extends in the circumferential direction. The core back portion 12B shown in FIGS. 2 to 4 has an annular ring shape. The center of the annular ring shape corresponds to the center axis J. A radial width of the annular ring shape is preferably constant or substantially constant. An inner circumferential surface of the annular ring shape faces an outer circumferential surface of the cylindrical portion 15C of the bracket 15.

Each of the tooth portions 12T extends in the radial direction. The core back portion 12B is located at one end of the tooth portion 12T, and the umbrella portion 12U is preferably located at the other end of the tooth portion 12T. The tooth portion 12T shown in FIGS. 2 to 4 is located on the radially outer side of the core back portion 12B. That is, the core back portion 12B is located at a radially inner end of the tooth portion 12T, and the umbrella portion 12U is located at a radially outer end of the tooth portion 12T. The tooth portion 12T also has a rectangular or substantially rectangular shape that linearly extends in the radial direction while maintaining a constant circumferential width.

Each of the umbrella portions 12U is located at one end of the tooth portion 12T, and extends in the circumferential direction. A circumferential width of the umbrella portion 12U is larger than that of the tooth portion 12T. A radial length of the umbrella portion 12U is smaller than that of the tooth portion 12T. The umbrella portion 12U shown in FIGS. 2 to 4 is provided at the radially outer end of the tooth portion 12T. An outer circumferential surface of the umbrella portion 12U faces an inner circumferential surface of the rotor 11. Therefore, a magnetic flux produced by the rotor 11 partly enters the core 120 through the outer circumferential surface of the umbrella portion 12U, and generates a magnetic field in the radial or substantially radial direction in the umbrella portion 12U.

The coil 121 is preferably defined by a conductive wire wound around the core 120. When an electric drive current is passed through the conductive wire, a magnetic flux is generated in the core 120 as a magnetic core. Therefore, circumferential torque is generated between the umbrella portion 12U and the rotor magnet 111, and the shaft 10 is caused to rotate about the center axis J. The conductive wire of the coil 121 is circumferentially wound around the tooth portion 12T. Thus, a radial magnetic flux is generated in the tooth portion 12T according to a change amount of the drive current. The magnetic flux flows within the umbrella portion 12U and the core back portion 12B located at the both ends of the tooth portion 12T.

Note that the conductive wire of the coil 121 is wound around the laminate formed by stacking the two or more electromagnetic steel sheets 122. Although the coil 121 is wound around the tooth portion 12T by interposing an insulator, for example, made of electrically insulating resin between the coil 121 and the tooth portion 12T so as to prevent electrical conduction with the core 120, the description is omitted in the present preferred embodiment for the sake of convenience. Note that electrical insulation may be effected by powder coating in which an insulating powder film is provided on the core 120 instead of using the insulator.

When a magnetic flux density in the core 120 changes, eddy currents flow in the core 120. The eddy currents are currents which flow in a loop in a plane perpendicular to the magnetic flux, and flow in a direction to oppose the change in the magnetic flux density. Since the respective electromagnetic steel sheets 122 defining the core 120 are insulated from each other, a path for the eddy currents is provided in each of the electromagnetic steel sheets 122, and is not provided across the separate electromagnetic steel sheets 122. That is, the path for the eddy currents is defined in a region within each of the electromagnetic steel sheets 122, and in a plane perpendicular to the magnetic flux.

Figure 5:
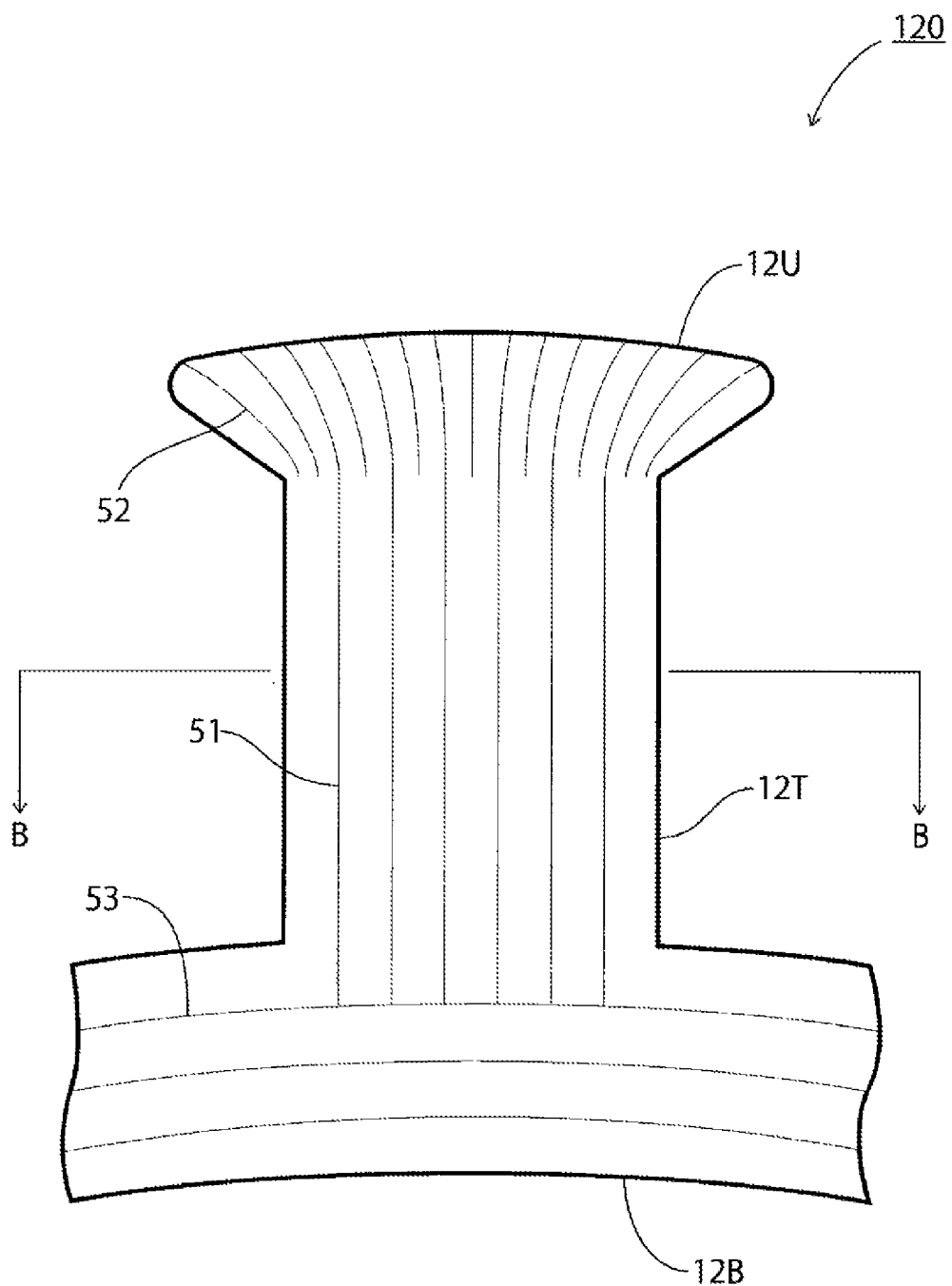
FIG. 5 is a view illustrating one example of a detailed configuration of a core 120 according to a preferred embodiment of the present invention.
Figure 6:
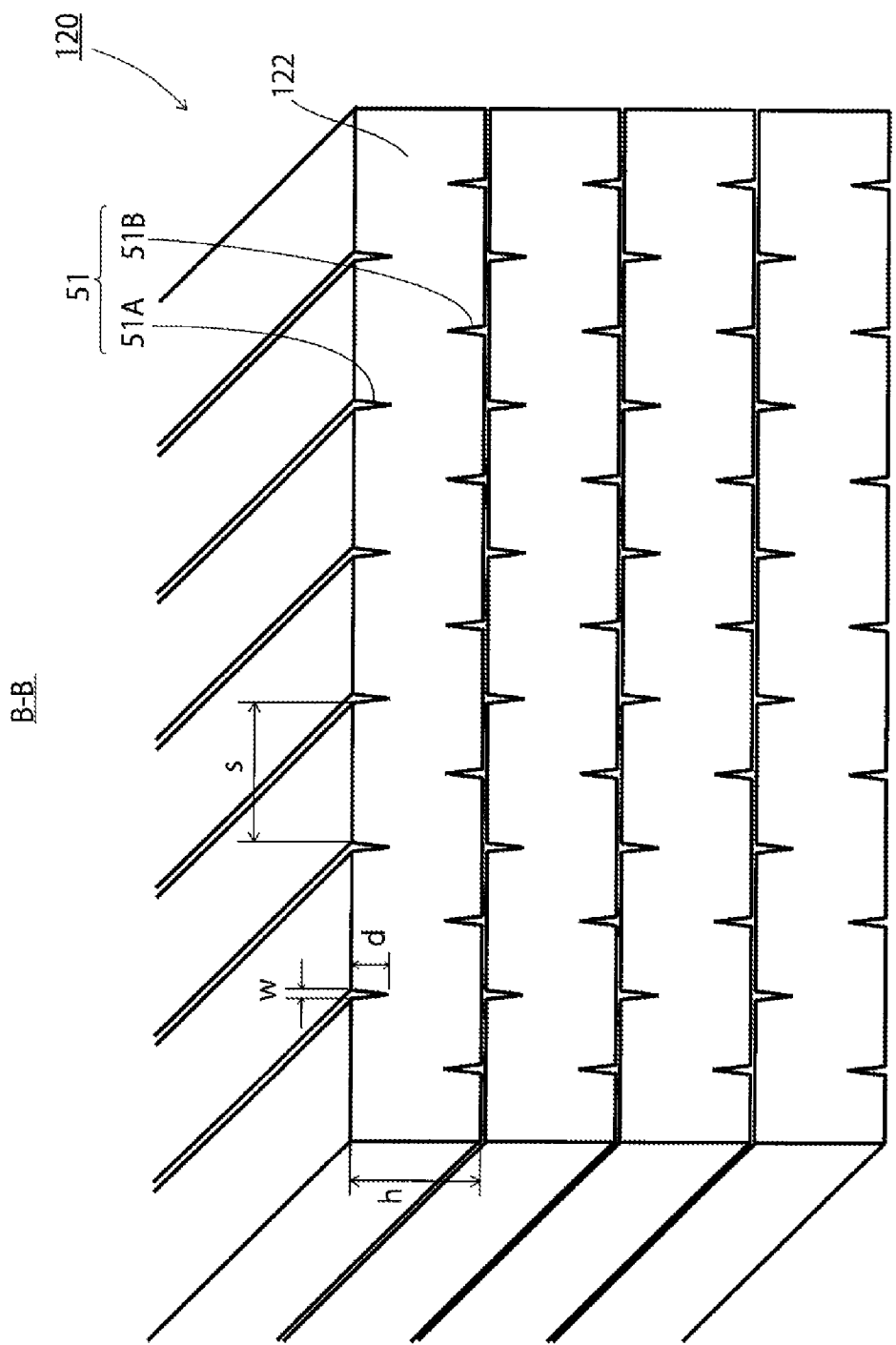
FIG. 6 is a perspective view including a section of the core 120 taken along a cutting line B-B in FIG. 5.

FIGS. 5 and 6 are views illustrating one example of a detailed configuration of the core 120. FIG. 5 is an enlarged view illustrating the core 120 in a state in which the coil 121 is not attached, and shows an appearance as viewed from the axial direction similarly to FIG. 3. FIG. 6 is a perspective view including a section of the core 120 taken along a cutting line B-B in FIG. 5.

Recessed portions 51 to 53 are preferably provided in a surface of each of the electromagnetic steel sheets 122 constituting the core 120. The recessed portions 51 to 53 are preferably defined in each of the tooth portion 12T, the umbrella portion 12U, and the core back portion 12B of the electromagnetic steel sheet 122, respectively. A depth d of the recessed portions 51 to 53 is smaller than a thickness h of the electromagnetic steel sheet 122. The recessed portions 51 to 53 do not axially penetrate all the way through the electromagnetic steel sheet 122. For example, the recessed portions 51 to 53, the depth d of which preferably is about 100 μm, are defined in the electromagnetic steel sheet 122, the thickness h of which preferably is about 350 μm. The recessed portions 51 to 53 also have an elongated opening in the surface of the electromagnetic steel sheet 122. In the above description, "elongated" means that a length in a direction in which the recessed portion extends is larger than a groove width of the recessed portion. That is, the recessed portions 51 to 53 are defined as groove portions of the electromagnetic steel sheet 122.

The eddy currents predominantly flow in the vicinity of the surface of the electromagnetic steel sheet 122. Therefore, the path for the eddy currents is caused to meander by forming the recessed portions 51 to 53 in the electromagnetic steel sheet 122, so that a length of the path is extended. As a result, an electrical resistance R in the path will be increased, which causes a corresponding decrease in an eddy current I (this is because voltage V=IR. Since V remains constant, if R is increased, I must be decreased). An eddy current loss is a loss by Joule heat generated by the flow of the eddy currents, and is generally provided as $R \times I^2$. Therefore, when the recessed portions 51 to 53 are provided in the electromagnetic steel sheet 122, the eddy current loss is significantly reduced or minimized, and efficiency of the motor is improved. Moreover, as compared to a case in which a slit penetrating the electromagnetic steel sheet 122 is provided, a mechanical strength of the electromagnetic steel sheet 122 is ensured.

The recessed portions 51 to 53 preferably have a shape extending in the same or substantially the same direction as a direction of the magnetic flux flowing in the electromagnetic steel sheet 122. Since the eddy currents flow in the plane perpendicular to the magnetic flux, the recessed portions 51 to 53 are crossed with the eddy currents when viewed in plan view from the axial direction by matching or substantially matching the extension direction of the recessed portions 51 to 53 with the direction of the magnetic flux. The generation of the eddy currents is thus effectively significantly reduced or minimized. Also, when each of the recessed portions 51 to 53 includes three or more recessed portions that are disposed parallel or substantially parallel to each other at the same or substantially the same interval between the adjacent recessed portions, the eddy currents are more effectively reduced or minimized.

The recessed portions 51 to 53 are preferably formed, for example, by irradiating the electromagnetic steel sheet 122 with laser light. Since the core 120 is the laminate of the two or more electromagnetic steel sheets 122, a variation in the core 120 may be increased when slight distortion occurs in each of the electromagnetic steel sheets 122. Thus, it is desirable to use a short pulse laser to machine the recessed portions 51 to 53. Particularly, by using a picosecond pulse laser or a femtosecond pulse laser, it is possible to prevent an occurrence of distortion in the electromagnetic steel sheet 122 at the time of machining the recessed portions 51 to 53.

It is desirable that the width of the recessed portions 51 to 53 be as small as possible in view of ensuring the mechanical strength of the electromagnetic steel sheet 122 since the width of the recessed portions 51 to 53 hardly affects the eddy current loss. Thus, an axial sectional shape of the recessed portions 51 to 53 is preferably provided as a V shape where the width becomes smaller with distance from the surface of the electromagnetic steel sheet 122. Particularly, it is desirable that an opening width w of the recessed portions 51 to 53 is smaller than the depth d, and the sectional shape of the recessed portions 51 to 53 is defined as a V shape. For example, a section of the recessed portions 51 to 53 is defined as a V shape in which the depth d=100 μm and the opening width w=20 μm. That is, the depth d of a first recessed portion or a second recessed portion described below is larger than the circumferential width w. It is also desirable to arrange the recessed portions 51 to 53 so as to have a volume ratio of about 1% or less to the electromagnetic steel sheet 122, for example.

Each of the recessed portions 51 to 53 can be defined in an upper surface and a lower surface facing each other of the electromagnetic steel sheet 122. In the present specification, the recessed portions 51 to 53 defined in the upper surface of the electromagnetic steel sheet 122 are referred to as a first upper recessed portion, a second upper recessed portion, and a third upper recessed portion, respectively, and the recessed portions 51 to 53 defined in the lower surface of the electromagnetic steel sheet 122 are referred to as a first lower recessed portion, a second lower recessed portion, and a third lower recessed portion, respectively. Although the example in which each of the recessed portions 51 to 53 is provided in the upper surface and the lower surface of the electromagnetic steel sheet is described in the present preferred embodiment, the recessed portions 51 to 53 may be provided in at least one of the upper surface and the lower surface of the electromagnetic steel sheet 122.

The first recessed portion 51 is a recessed portion that is defined in the tooth portion 12T of the electromagnetic steel sheet 122. The first recessed portion 51 preferably includes an opening in the surface of the electromagnetic steel sheet 122. In the opening, a circumferential width is smaller than a radial length, and the opening extends in the radial direction. That is, the first recessed portion 51 has a groove shape extending in the radial direction. Also, the two or more first recessed portions 51 are disposed in the circumferential direction in the tooth portion 12T.

The magnetic flux radially flows in the tooth portion 12T. Therefore, by radially extending the first recessed portion 51, the first recessed portion 51 is crossed with the eddy currents when viewed in plan view from the axial direction, so that the eddy current loss is significantly reduced or minimized. Preferably, by disposing the two or more first recessed portions 51 in the circumferential direction, the eddy currents are further reduced. Moreover, by disposing the three or more first recessed portions 51 at the same or substantially the same interval, the eddy currents are more effectively significantly reduced or minimized.

First upper recessed portions 51A in FIG. 6 are the first recessed portions 51 provided in the upper surface of the electromagnetic steel sheet 122, and first lower recessed portions 51B in FIG. 6 are the first recessed portions 51 provided in the lower surface of the electromagnetic steel sheet 122. That is, the first recessed portions 51 are defined in the upper surface and the lower surface of the electromagnetic steel sheet 122.

When the first upper recessed portions 51A and the first lower recessed portions 51B are located at different positions, the mechanical strength of the electromagnetic steel sheet 122 is further increased, and the length of the path for the eddy currents is further extended as compared to a case in which the first upper recessed portions 51A and the first lower recessed portions 51B are located at the same positions. Therefore, it is desirable that the first upper recessed portions 51A and the first lower recessed portions 51B are located at circumferentially different positions. For example, it is desirable that at least one of the first upper recessed portions 51A is arranged between the two first lower recessed portions 51B adjacent to each other in the circumferential direction, or at least one of the first lower recessed portions 51B is arranged between the two first upper recessed portions 51A adjacent to each other in the circumferential direction. Therefore, at least one of the first recessed portions located in the upper surface or the lower surface of the electromagnetic steel sheet is located between the two adjacent first recessed portions located in the surface on the axially opposite side. Furthermore, it is more desirable that all of the first upper recessed portions 51A and all of the first lower recessed portions 51B are located at circumferentially different positions. That is, the first recessed portions are alternately located in the upper surface and the lower surface of the electromagnetic steel sheet in the circumferential direction. It is particularly desirable that the first upper recessed portions 51A and the first lower recessed portions 51B are alternately defined in the circumferential direction as shown in FIG. 6.

Furthermore, it is desirable that each of the first upper recessed portions 51A is located in or substantially in the center between the two first lower recessed portions 51B adjacent to each other, and each of the first lower recessed portions 51B is located in or substantially in the center between the two first upper recessed portions 51A adjacent to each other. It is also desirable that an interval s between the first recessed portions 51 is smaller than a winding pitch p of the conductive wire constituting the coil 121. The interval s between the first recessed portions 51 is a distance between opening edge portions of the first recessed portions 51 adjacent to each other. The winding pitch p is a distance between the centers of the conductive wires adjacent to each other.

Figure 7:
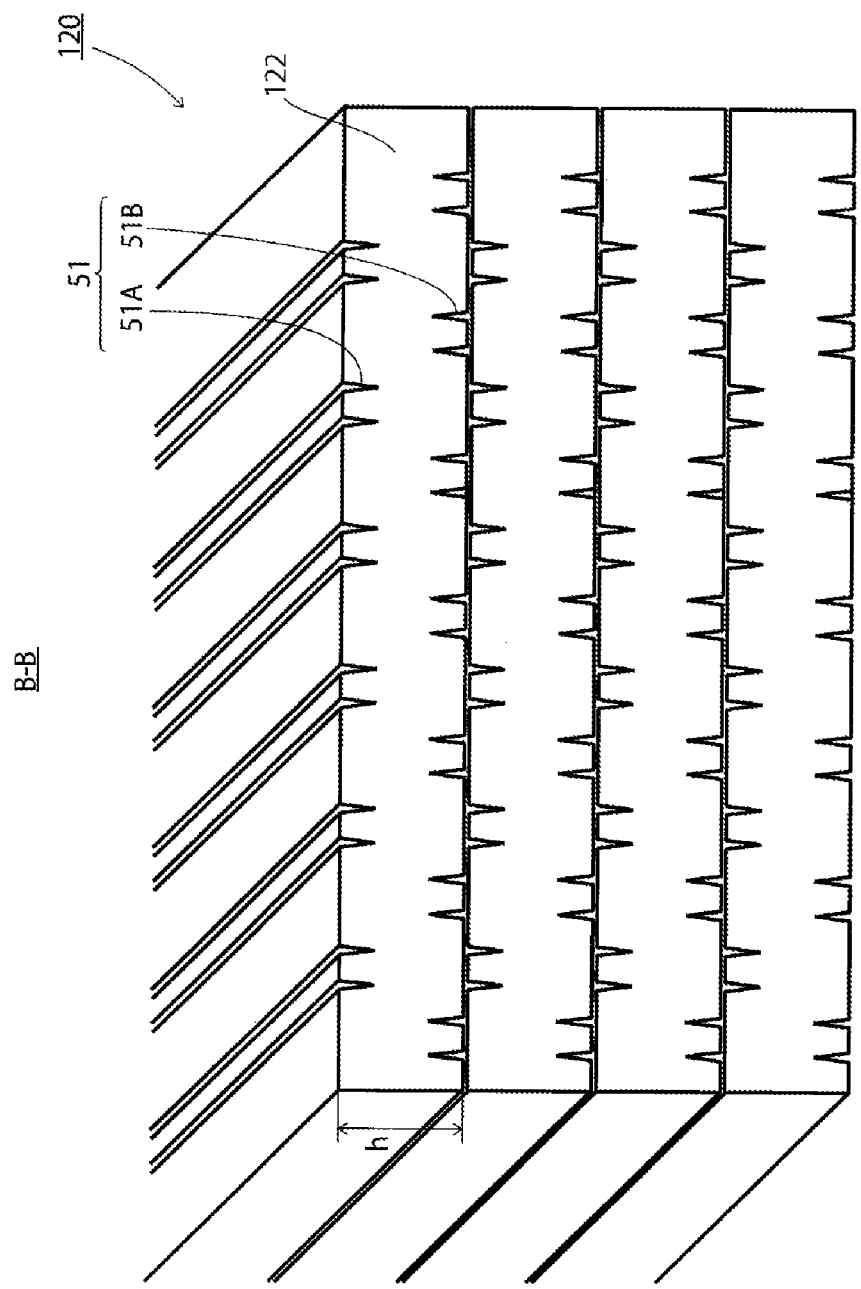
FIG. 7 is a perspective view illustrating another example of the section of the core 120.

FIG. 7 is a view illustrating another example of the detailed configuration of the core 120. FIG. 7 is a perspective view including a section of the core 120 taken along a cutting line B-B in FIG. 5 similarly to FIG. 6. In FIG. 7, the first upper recessed portions 51A and the first lower recessed portions 51B are located at circumferentially different positions. The first upper recessed portions 51A are arranged between the two first lower recessed portions 51B adjacent to each other, and the first lower recessed portions 51B are arranged between the two first upper recessed portions 51A adjacent to each other. That is, although the first upper recessed portions 51A and the first lower recessed portions 51B are not alternately defined in the circumferential direction, a combination of the two first upper recessed portions 51A adjacent to each other and a combination of the two first lower recessed portions 51B adjacent to each other are alternately defined in the circumferential direction.

The second recessed portion 52 is preferably a recessed portion that is defined in the umbrella portion 12U of the electromagnetic steel sheet 122. The second recessed portion 52 preferably includes an opening in the surface of the electromagnetic steel sheet 122. In the opening, a circumferential width is smaller than a radial length, and the opening extends in the radial or substantially radial direction. That is, the second recessed portion 52 has a groove shape extending in the radial or substantially radial direction. Also, the two or more second recessed portions 52 are disposed in the circumferential direction in the umbrella portion 12U.

The second recessed portion 52 is arranged so as to be matched or substantially matched with the direction of the magnetic flux flowing in the umbrella portion 12U. By matching or substantially matching the extension direction of the second recessed portion 52 with the direction of the magnetic flux, the second recessed portion 52 is crossed with the eddy currents when viewed in plan view from the axial direction, so that the eddy current loss is effectively significantly reduced or minimized. Also, by disposing the two or more second recessed portions 52 in the circumferential direction, the eddy currents are further reduced.

While the second recessed portions 52 extend in the radial or substantially radial direction, an interval between the adjacent second recessed portions 52 is increased toward the radially outer side. To be more specific, the second recessed portions 52 extend linearly in the radial direction at a position around the circumferential center of the umbrella portion 12U. On the other hand, the interval between the adjacent second recessed portions 52 is increased toward the rotor 11 at a position around opposite circumferential ends. That is, the two or more second recessed portions are located in the surface of the umbrella portion, and the interval between the adjacent second recessed portions is increased toward the rotor.

The second recessed portions 52 are provided in the upper surface and the lower surface of the electromagnetic steel sheet 122. It is desirable that second upper recessed portions defined in the upper surface and second lower recessed portions defined in the lower surface are located at different positions from each other. For example, at least one of the second upper recessed portions is arranged between the two second lower recessed portions adjacent to each other in the circumferential direction, or at least one of the second lower recessed portions is arranged between the two second upper recessed portions adjacent to each other in the circumferential direction. Also, it is more desirable that all of the second upper recessed portions and all of the second lower recessed portions are located at circumferentially different positions. It is particularly desirable that the second upper recessed portions and the second lower recessed portions are alternately defined in the circumferential direction. Furthermore, it is desirable that each of the second upper recessed portions is located in or substantially in the center between the second lower recessed portions adjacent to each other in the circumferential direction, and each of the second lower recessed portions is located in substantially the center between the second upper recessed portions adjacent to each other in the circumferential direction.

The umbrella portion 12U is provided at the radially outer end of the tooth portion 12T, and faces the rotor 11. Therefore, the magnetic flux generated by the drive current of the coil 121, and the magnetic flux generated by the magnet 111 of the rotor 11 exist in the umbrella portion 12U. Moreover, when magnetic flux densities are compared, a magnetic flux density of the latter one is larger in most cases. Therefore, a larger magnetic field is defined in the umbrella portion 12U than in the tooth portion 12T, so that a larger eddy current loss could occur. Thus, it is desirable that the interval between the second recessed portions 52 adjacent to each other is smaller than the interval between the first recessed portions 51 adjacent to each other. For example, it is desirable that a minimum value of the interval between the second recessed portions 52 is smaller than a minimum value of the interval between the first recessed portions 51. It is also desirable that an average value of the interval between the second recessed portions 52 is smaller than an average value of the interval between the first recessed portions 51.

The third recessed portion 53 is preferably a recessed portion that is defined in the core back portion 12B. The third recessed portion 53 has an opening extending in the substantially circumferential direction. In the opening, a radial width is smaller than a circumferential length, and the opening extends in the circumferential direction. That is, the third recessed portion 53 has a groove shape extending in the circumferential direction. The magnetic flux circumferentially flows in the core back portion 12B. Therefore, by circumferentially extending the third recessed portion 53, the third recessed portion 53 is crossed with the eddy currents when viewed in plan view from the axial direction, so that the eddy current loss is significantly reduced or minimized.

By disposing the two or more third recessed portions 53 in the radial direction, the eddy currents are further significantly reduced or minimized. Moreover, by disposing the three or more third recessed portions 53 at the same or substantially the same interval, the eddy currents are more effectively significantly reduced or minimized.

The third recessed portions 53 are defined in the upper surface and the lower surface facing each other of the electromagnetic steel sheet 122. It is desirable that third upper recessed portions defined in the upper surface and third lower recessed portions defined in the lower surface are located at different positions from each other. For example, it is desirable that at least one of the third upper recessed portions is arranged between the third lower recessed portions adjacent to each other in the radial direction, or at least one of the third lower recessed portions is located between the third upper recessed portions adjacent to each other in the radial direction. Also, it is more desirable that all of the third upper recessed portions and all of the third lower recessed portions are located at radially different positions. It is particularly desirable that the third upper recessed portions and the third lower recessed portions are alternately defined in the radial direction. Furthermore, it is desirable that each of the third upper recessed portions is located in or substantially in the center between the third lower recessed portions adjacent to each other in the radial direction, and each of the third lower recessed portions is located in or substantially in the center between the third upper recessed portions adjacent to each other in the radial direction.

Simulation Result

Figure 8:
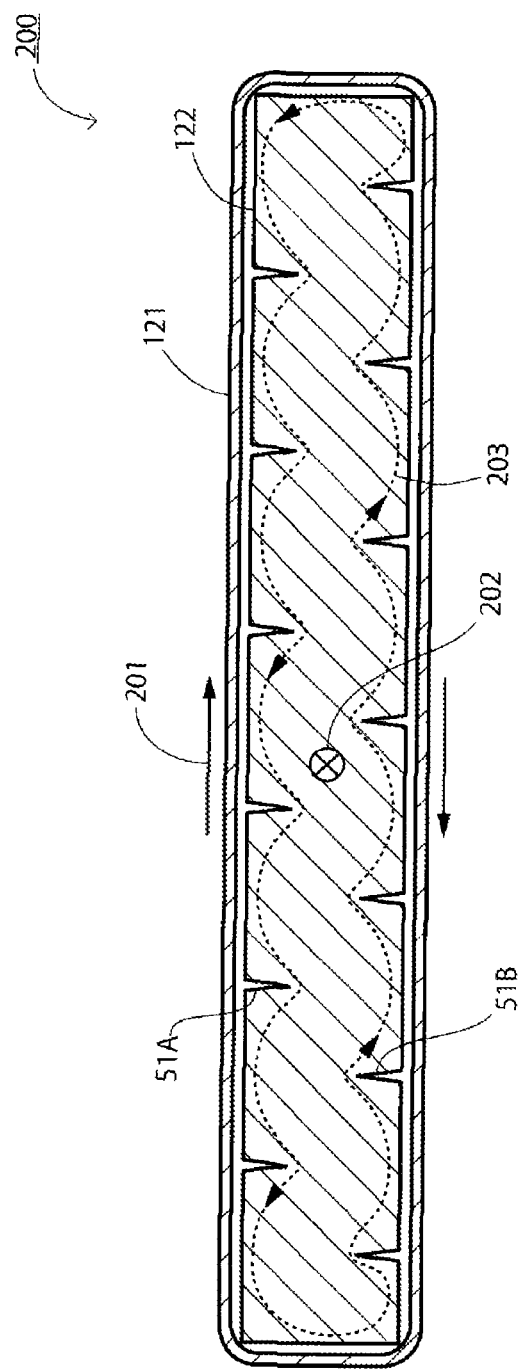
FIG. 8 is a view schematically illustrating an armature for evaluation 200 according to a preferred embodiment of the present invention.
Figure 9:
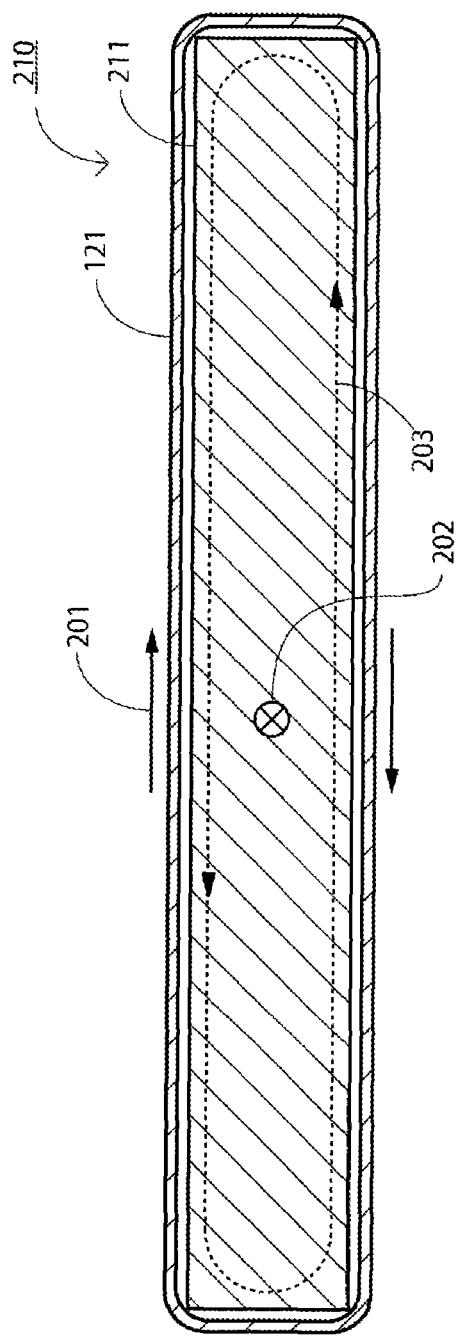
FIG. 9 is a view schematically illustrating an armature for comparison 210.

FIGS. 8 and 9 are views schematically illustrating a simulation result of the eddy current loss. FIG. 8 shows an armature for evaluation 200 including an electromagnetic steel sheet 122 according to a preferred embodiment of the present invention, and FIG. 9 shows an armature for comparison 210 including a conventional electromagnetic steel sheet 211 in which no recessed portion 51 is formed.

In the armature for evaluation 200 in FIG. 8, a conductive wire is wound around the single electromagnetic steel sheet 122. The electromagnetic steel sheet 122 is the electromagnetic steel sheet shown in FIG. 6. The first upper recessed portions 51A are defined in the upper surface of the electromagnetic steel sheet 122. The first lower recessed portions 51B are defined in the lower surface of the electromagnetic steel sheet 122. The first upper recessed portions 51A and the first lower recessed portions 51B are alternately defined in a right-left direction in FIG. 6. Also, the thickness h of the electromagnetic steel sheet 122 is 350 μm. In the first upper recessed portions 51A and the first lower recessed portions 51B, the depth d is 100 μm, and the opening width w is 20 μm. The first upper recessed portions 51A and the first lower recessed portions 51B are formed by emitting laser light from a short pulse laser, and removing approximately 1% of a volume of the electromagnetic steel sheet 122.

In the armature for comparison 210 in FIG. 9, a conductive wire is wound around the single electromagnetic steel sheet 211. The electromagnetic steel sheet 211 is a conventional electromagnetic steel sheet used for a general motor armature, and is the same as the electromagnetic steel sheet 122 according to the present preferred embodiment except that the first upper recessed portions 51A and the first lower recessed portions 51B are not provided.

When a clockwise drive current 201 flows through the coil 121, a magnetic field 202 is formed from a near side to a far side perpendicular to the paper surface in each of the electromagnetic steel sheets 122 and 211. When the magnetic field 202 changes, an eddy current 203 flows to significantly reduce or prevent the change. For example, when the magnetic field 202 increases, the eddy current 203 flows in a counterclockwise direction.

Eddy current losses generated in the armature for evaluation 200 and the armature for comparison 210 under the same conditions were obtained by a simulation, and it was discovered that the eddy current loss in the armature for evaluation 200 was reduced by 30% as compared to that in the armature for comparison 210.

The eddy current 203 flows through a loop path defined in each of the electromagnetic steel sheets 122 and 211. The eddy current 203 also mainly flows in the vicinity of the surface of each of the electromagnetic steel sheets 122 and 211. Therefore, a path for the eddy current 203 is defined as a smooth curved path extending along the surface of the electromagnetic steel sheet 211 in FIG. 9. In contrast, in FIG. 8, since the first upper recessed portions 51A and the first lower recessed portions 51B are provided in the upper surface and the lower surface of the electromagnetic steel sheet 122, a flow path for the eddy current 203 meanders so as to avoid the recessed portions, so that a length of the flow path is extended. As a result, the eddy current 203 is reduced, and the eddy current loss is also reduced.

The electromagnetic steel sheet 122 according to the present preferred embodiment can also be considered as equivalent to an electromagnetic steel sheet that is shaped so as to have the thickness h of about 350 μm by repetitively bending an electromagnetic steel sheet having the thickness h of about 250 μm, for example. That is, it is possible to ensure a larger mechanical strength while achieving an eddy current loss equal to that of the electromagnetic steel sheet having the thickness of about 250 μm, for example.

It is also possible to significantly reduce or prevent the eddy current loss while avoiding an increase in cost caused by decreasing the thickness of the electromagnetic steel sheet 122. When the thinner electromagnetic steel sheet 122 is used, the number of the electromagnetic steel sheets 122 required to fabricate the core 120 having the same axial length is increased. Thus, if the thickness of the electromagnetic steel sheet 122 is decreased in order to significantly reduce or minimize the eddy current loss, machining man-hours required to fabricate the core 120 is increased. However, since the electromagnetic steel sheet 122 according to the present preferred embodiment significantly reduces or minimizes the eddy current loss without decreasing the thickness of the electromagnetic steel sheet 122, the eddy current loss is significantly reduced or minimized without notably increasing the cost.

Crystal Grain Layers of Preferred Embodiments

Figure 10:
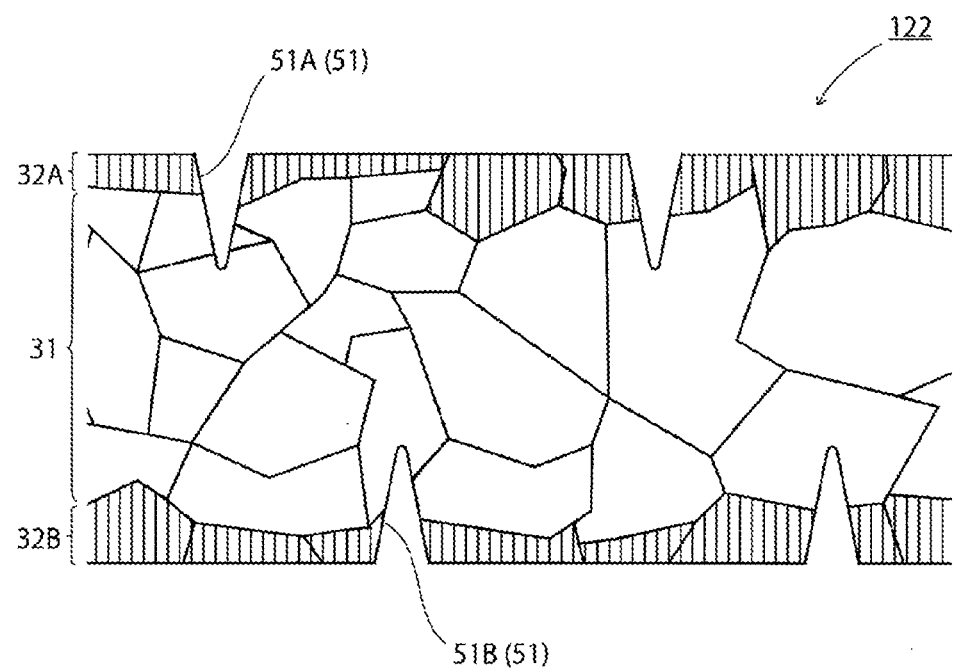
FIG. 10 is a view schematically illustrating a relationship between first recessed portions 51 and crystal grain layers of an electromagnetic steel sheet 122 according to a preferred embodiment of the present invention.

FIG. 10 is a view schematically illustrating a relationship between the first recessed portions 51 and crystal grain layers of the electromagnetic steel sheet 122, and shows the section taken along B-B in FIG. 5 in an enlarged scale. The electromagnetic steel sheet 122 preferably includes a first crystal grain layer 31, and second crystal grain layers 32A and 32B on an upper side and a lower side of the first crystal grain layer 31. Note that hatching is given to the second crystal grain layers 32A and 32B in FIG. 10.

The first crystal grain layer 31 is a layer including crystal grains that are not exposed through the upper surface and the lower surface of the electromagnetic steel sheet 122 before the recessed portions 51 to 53 are formed. The second crystal grain layers 32A and 32B are layers including crystal grains that are exposed from the upper surface or the lower surface of the electromagnetic steel sheet 122. The crystal grain is a mass of crystals whose crystal orientations are aligned. The crystal grains of the second crystal grain layers 32A and 32B have a smaller grain size than the crystal grains of the first crystal grain layer 31.

The first recessed portions 51 are configured so as to reach the first crystal grain layer 31. That is, the depth d of the first recessed portions 51 is preferably larger than a thickness of the second crystal grain layers 32A and 32B. The crystal grains of the first crystal grain layer 31 define a portion of an inner surface of each of the first recessed portions 51. Since a relationship between each of the second and third recessed portions 52 and 53, and the crystal grain layers 31, 32A, and 32B is the same as that of the case of the first recessed portions 51, the overlapping description is omitted.

Preferred Embodiment 2

In Preferred Embodiment 1, the example in which the recessed portions 51 to 53 preferably define the groove portions of the electromagnetic steel sheet 122 has been described. In contrast, a case in which each of the recessed portions 51 to 53 is a plurality of micro recessed portions 54 disposed in a line is described in the present preferred embodiment.

Figure 11:
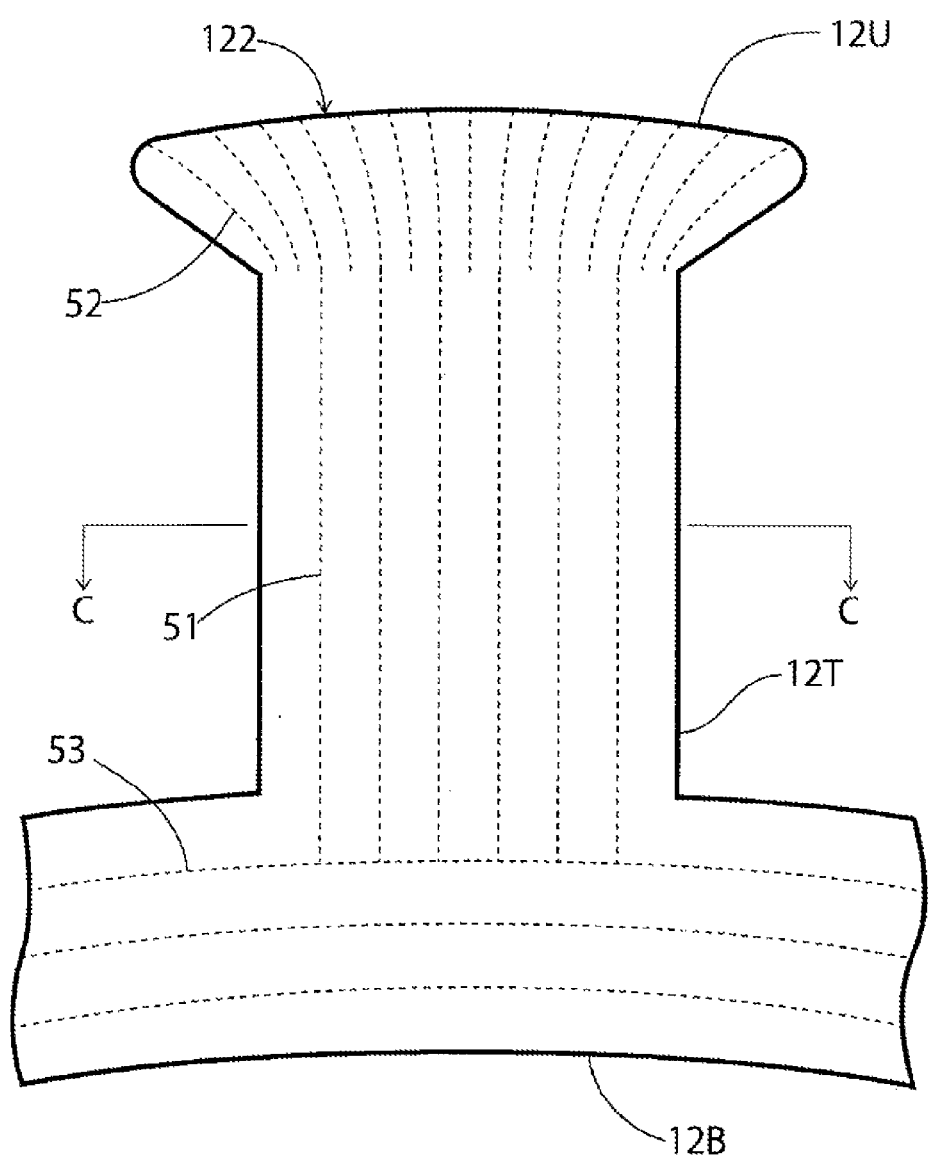
FIG. 11 is a view illustrating one example of the detailed configuration of the core 120 according to Preferred Embodiment 2 of the present invention.
Figure 12:
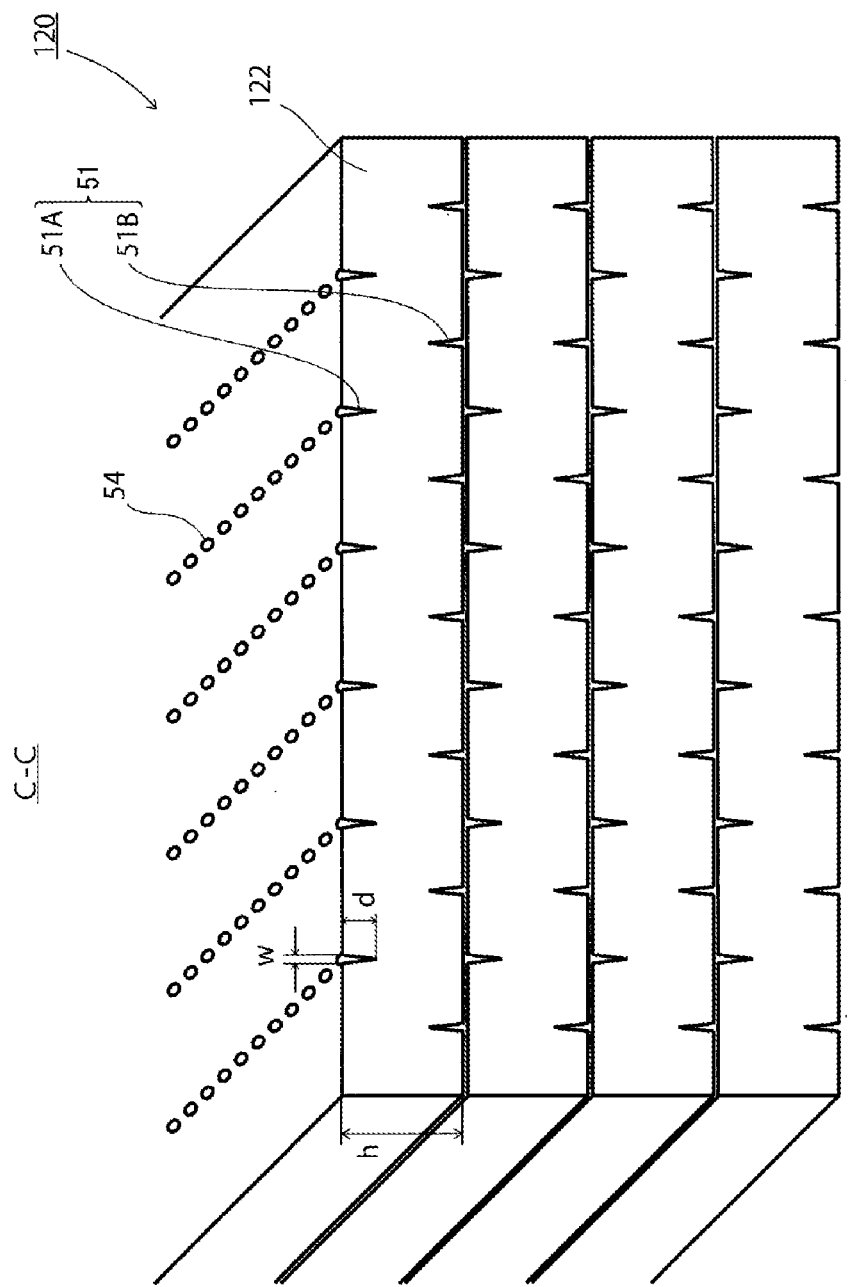
FIG. 12 is a perspective view including a section of the core 120 taken along a cutting line C-C in FIG. 11.

FIGS. 11 and 12 are views illustrating one example of the detailed configuration of the core 120 according to Preferred Embodiment 2 of the present invention. FIG. 11 is an enlarged view illustrating a portion of the core 120 in an enlarged scale, and shows an appearance as viewed from the axial direction similarly to FIG. 5. FIG. 12 is a perspective view including a section of the core 120 taken along a cutting line C-C in FIG. 11.

Each of the recessed portions 51 to 53 preferably includes the plurality of micro recessed portions 54. The depth d of the micro recessed portions 54 is smaller than the thickness h of the electromagnetic steel sheet 122. The micro recessed portions 54 do not axially penetrate all the way through the electromagnetic steel sheet 122. For example, the micro recessed portions 54, the circumferential width of which is preferably about 20 μm and the depth d of which is preferably about 100 μm, are defined in the electromagnetic steel sheet 122, the thickness h of which is preferably about 350 μm. A volume of the micro recessed portions is preferably about 1% or less of the volume of the electromagnetic steel sheet. Each of the micro recessed portions 54 has an opening preferably having a circular or oval shape in the surface of the electromagnetic steel sheet 122. The openings of the plurality of micro recessed portions 54 are disposed in a line on the surface of the electromagnetic steel sheet 122. The linear recessed portions 51 to 53 are defined as the lines of the micro recessed portions 54 in the surface of the electromagnetic steel sheet 122.

The micro recessed portions 54 are formed preferably by irradiating the electromagnetic steel sheet 122 with laser light. For example, a short pulse laser can be used. Particularly, by using a picosecond pulse laser or a femtosecond pulse laser, it is possible to prevent the occurrence of distortion in the electromagnetic steel sheet 122 at the time of machining the micro recessed portions 54.

It is desirable that the opening width w of the micro recessed portions 54 is smaller than the depth d, and a section of the micro recessed portions 54 has a V shape. For example, a sectional shape of the micro recessed portions 54 is defined as a V shape in which the depth d=100 μm and the opening width w=20 μm. It is also desirable to form the micro recessed portions 54 by removing a volume ratio of about 1% or less to the electromagnetic steel sheet 122 in view of ensuring the mechanical strength. The opening width w is an opening length of the micro recessed portions 54 in a width direction of the recessed portions 51 to 53.

The first recessed portion 51 is a recessed portion that is defined in the tooth portion 12T of the electromagnetic steel sheet 122, and is defined by the plurality of micro recessed portions 54. By disposing the micro recessed portions 54 in a line on the surface of the electromagnetic steel sheet 122, the linear first recessed portion 51 extending in the radial direction is formed.

The first upper recessed portion 51A in FIG. 12 is the first recessed portion 51 provided in the upper surface of the electromagnetic steel sheet 122, and is defined by the plurality of micro recessed portions 54 defined in the upper surface of the electromagnetic steel sheet 122. Similarly, the first lower recessed portion 51B in FIG. 12 is the first recessed portion 51 provided in the lower surface of the electromagnetic steel sheet 122, and is defined by the plurality of micro recessed portions 54 defined in the lower surface of the electromagnetic steel sheet 122.

Although examples of an outer rotor type motor have been described in the above preferred embodiments, the present invention is not limited to the motor as described above. That is, various preferred embodiments of the present invention can be applied to a motor including an armature in which the core 120 is defined by stacking the electromagnetic steel sheets 122, the tooth portion 12T of the core 120 extends in the radial direction, and the conductive wire is circumferentially wound around the tooth portion 12T.

For example, the preferred embodiments of the present invention can be applied to an inner rotor type motor in which the rotor 11 is located on the radially inner side of the stator 12. In the case of the inner rotor type motor, the tooth portion 12T is located on the radially inner side of the core back portion 12B. That is, the core back portion 12B is located at the radially outer end of the tooth portion 12T, and the umbrella portion 12U is located at the radially inner end of the tooth portion 12T.

Also, although the example of the brushless type motor in which the stator 12 is defined by the armature has been described in the above preferred embodiments, the present invention is not limited to the motor as described above. That is, preferred embodiments of the present invention can be applied to a motor with a brush in which the rotor is defined by the armature.

The core 120 according to the preferred embodiments of the present invention may be a straight core (developed core) in which the core back portion 12B is provided with a ring shape by folding the core after attaching the coil 121 thereto. The core 120 according to the preferred embodiments of the present invention may be a core not including the umbrella portion 12U. The core 120 according to the preferred embodiments of the present invention may be also defined by two or more split cores. That is, the core 120 may be formed by connecting two or more split cores to which the coil is previously attached.

The example of the case in which the core back portion 12B has an annular ring shape has been described in the above preferred embodiments of the present invention. However, as long as the core back portion 12B extends in the circumferential direction, the core back portion 12B may have another shape. For example, the core back portion 12B may have a ring shape having polygonal inner edges or outer edges. Also, the width of the core back portion 12B may not be constant.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor armature of a motor, comprising:
   a core including a stack of electromagnetic steel sheets, and a tooth portion extending in a radial direction of the motor;
   a conductive wire that is wound around the tooth portion in a circumferential direction; and
   two or more first recessed portions extending in the radial direction are respectively located in two opposed surfaces of the tooth portion of each single one of the electromagnetic steel sheets; wherein
   none of the two or more first recessed portions axially penetrate all the way through any of the electromagnetic steel sheets.

2. The motor armature according to claim 1, wherein the two opposed surfaces are an upper surface and a lower surface of the electromagnetic steel sheet.

3. The motor armature according to claim 2, wherein at least one of the first recessed portions located in one of the upper surface or the lower surface of the electromagnetic steel sheet is located between two adjacent ones of the first recessed portions located in another one of the upper surface or the lower surface of the electromagnetic steel sheet.

4. The motor armature according to claim 3, wherein the first recessed portions are alternately located in the upper surface and the lower surface of the electromagnetic steel sheet in the circumferential direction.

5. The motor armature according to claim 4, wherein there are at least three of the two or more first recessed portions which are located at a same or substantially same interval in the circumferential direction.

6. The motor armature according claim 1, wherein
   the core includes an umbrella portion located at one end of the tooth portion, facing a magnet of the motor, and extending in the circumferential direction;
   two or more second recessed portions are located in a surface of the umbrella portion; and
   an interval between the adjacent ones of the second recessed portions of the umbrella portion is smaller than an interval between adjacent ones of the first recessed portions of the tooth portion.

7. The motor armature according to claim 6, wherein
   the core includes a core back located at the other end of the tooth portion and extending in the circumferential direction, and the umbrella portion located at the one end of the tooth portion, facing the magnet of the motor, and extending in the circumferential direction;
   a circumferential length of the umbrella portion is larger than a circumferential length of the tooth portion;
   the two or more second recessed portions are located in the surface of the umbrella portion; and
   the interval between the adjacent ones of the two or more second recessed portion increases towards a rotor.

8. The motor armature according to claim 6, wherein
   the electromagnetic steel sheet includes a first crystal grain layer, and second crystal grain layers provided on an upper side and a lower side of the first crystal grain layer and defined by crystal grains smaller than crystal grains of the first crystal grain layer; and
   the first recessed portions or the second recessed portions reach the first crystal grain layer.

9. The motor armature according to claim 1, wherein each of the first recessed portions includes a plurality of micro recessed portions that are radially arranged in a line.

10. The motor armature according to claim 9, wherein
the micro recessed portions have a circumferential width of about 20 µm and a depth of about 100 µm; and
a volume of the micro recessed portions is about 1% or less of a volume of one of the electromagnetic steel sheets.

11. The motor armature according to claim 6, wherein the first recessed portions or the second recessed portions have a groove shape.

12. The motor armature according to claim 6, wherein in the first recessed portions or the second recessed portions, a depth is larger than a circumferential width.

13. The motor armature according to claim 6, wherein the first recessed portions or the second recessed portions are formed by using a picosecond pulse laser or a femtosecond pulse laser.

14. A motor comprising:
a stator defined by a motor armature according to claim 1;
a rotatable shaft; and
a rotor that is attached to the shaft and rotates relative to the stator.

\* \* \* \* \*